United States Patent
Wilford et al.

(10) Patent No.: US 11,668,277 B2
(45) Date of Patent: Jun. 6, 2023

(54) WIND TURBINE JOINTED ROTOR BLADE HAVING A HOLLOW CHORD-WISE EXTENDING PIN

(71) Applicant: General Electric Company, Schenectady, NY (US)

(72) Inventors: Ashley Simone Wilford, Greenville, SC (US); Jon Stuart Wright, Greenville, SC (US); Scott Jacob Huth, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/289,959

(22) PCT Filed: Nov. 1, 2018

(86) PCT No.: PCT/US2018/058666
§ 371 (c)(1),
(2) Date: Apr. 29, 2021

(87) PCT Pub. No.: WO2020/091784
PCT Pub. Date: May 7, 2020

(65) Prior Publication Data
US 2022/0010767 A1    Jan. 13, 2022

(51) Int. Cl.
*F03D 1/06* (2006.01)
(52) U.S. Cl.
CPC ........ *F03D 1/0675* (2013.01); *F05B 2230/60* (2013.01); *F05B 2240/302* (2013.01); *F05B 2260/30* (2013.01)

(58) Field of Classification Search
CPC .............. F03D 7/0204; F05B 2270/321; F05B 2270/329
See application file for complete search history.

(56) References Cited

U.S. PATENT DOCUMENTS

| 851,196 A | 4/1907 | Bevans et al. |
| 4,474,536 A | 10/1984 | Gougeon et al. |
(Continued)

FOREIGN PATENT DOCUMENTS

| EP | 2186622 A1 | 5/2010 |
| EP | 3144526 A1 | 3/2017 |
(Continued)

OTHER PUBLICATIONS

PCT International Search Report & Written Opinion Corresponding to PCT/US2018/058666 dated Jul. 22, 2019.

*Primary Examiner* — Eldon T Brockman
(74) *Attorney, Agent, or Firm* — Dority & Manning, P.A.

(57) ABSTRACT

A rotor blade for a wind turbine includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment via a receiving section. The rotor blade also includes at least one chord-wise extending pin positioned through the chord-wise joint so as to secure the first and second blade segments together. Further, the chord-wise extending pin includes a hollow cross-section that extends from a trailing edge end to a leading edge end thereof.

12 Claims, 10 Drawing Sheets

(56) References Cited

U.S. PATENT DOCUMENTS

| | | | |
|---|---|---|---|
| 4,643,646 A | 2/1987 | Hahn et al. | |
| 4,732,542 A | 3/1988 | Hahn et al. | |
| 5,281,454 A | 1/1994 | Hanson | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 | 4/2011 | Riddell | |
| 7,927,077 B2 | 4/2011 | Olson | |
| 7,997,874 B2 | 8/2011 | van der Bos | |
| 7,998,303 B2 | 8/2011 | Baehmann et al. | |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 * | 2/2013 | Kawasetsu | F03D 80/30 416/226 |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 | 6/2017 | Zamora Rodriguez et al. | |
| 10,801,469 B2 * | 10/2020 | Hancock | F03D 1/0633 |
| 10,865,767 B2 * | 12/2020 | Rubner | F03D 1/0658 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Baehmann et al. | |
| 2010/0215494 A1 | 8/2010 | Bech et al. | |
| 2010/0304170 A1 | 12/2010 | Frederiksen | |
| 2011/0020126 A1 * | 1/2011 | Glenn | F03D 80/00 416/223 A |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 * | 6/2011 | Bech | F03D 1/0683 29/889.7 |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0100002 A1 * | 4/2012 | Kawasetsu | F03D 80/30 416/229 R |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0204200 A1 | 7/2015 | Eyb et al. | |
| 2015/0292477 A1 * | 10/2015 | Kratmann | F03D 1/0675 416/232 |
| 2015/0369211 A1 * | 12/2015 | Merzhaeuser | F03D 80/30 416/61 |
| 2016/0053799 A1 * | 2/2016 | Anasis | F16B 29/00 411/43 |
| 2017/0268482 A1 | 9/2017 | Beyland et al. | |
| 2018/0274521 A1 | 9/2018 | Akhtar et al. | |
| 2019/0264650 A1 * | 8/2019 | Rubner | F16B 11/006 |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2015/051803 A1 | 4/2015 |
| WO | WO2015/185066 A1 | 12/2015 |

\* cited by examiner

WIND TURBINE JOINTED ROTOR BLADE HAVING A HOLLOW CHORD-WISE EXTENDING PIN

FIELD

The present disclosure relates generally to wind turbines, and more particularly to a wind turbine jointed rotor blade having a hollow chord-wise extending pin.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

As wind turbines continue to increase in size, the rotor blades also increase in size. Thus, larger rotor blades may be constructed in segments that can be assembled on site via one or more pin joints. Increasing the blade length requires additional blade support, because gravity pulls along the increased length to create a larger bending moment than in shorter rotor blades. The pin joints are configured to allow the blade tip to flex to withstand some of this load. Such point joints, however, can add weight to the rotor blade and can cause issues with the structural integrity of the rotor blade if not properly designed.

Accordingly, the present disclosure is directed to an improved wind turbine jointed rotor blade having a structurally-reinforced hollow chord-wise extending pin so as to minimize mass of the joint, while also providing improved installation and optimized material usage. As such, the structurally-reinforced hollow chord-wise extending pin also prevents ovalization that could occur in a hollow tube design alone.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment via a receiving section. The rotor blade also includes at least one chord-wise extending pin positioned through the chord-wise joint so as to secure the first and second blade segments together. Further, the chord-wise extending pin includes a hollow cross-section that extends from a trailing edge end to a leading edge end thereof.

In one embodiment, the chord-wise extending pin may define a first outer diameter that begins at the trailing edge end and a second outer diameter that ends at the leading edge end. Further, the first outer diameter may be larger than the second outer diameter. Moreover, the first outer diameter may taper to the second outer diameter at a transitional region of the chord-wise extending pin. In one embodiment, the chord-wise extending pin may further taper from the second outer diameter to a smaller outer diameter at the leading edge end.

In further embodiments, the chord-wise extending pin may extend through a plurality of bushings provided in the internal support structures of the first and second blade segments. In additional embodiments, the chord-wise extending pin may also include one or more structural inserts arranged within the hollow cross-section. In such embodiments, the structural insert(s) may align with the plurality of bushings. In particular embodiments, the chord-wise extending pin may include a plurality of structural inserts arranged within the hollow cross-section. For example, the chord-wise extending pin may include a first structural insert arranged at the trailing edge end thereof and a second structural insert arranged at the leading edge end thereof.

In several embodiments, the chord-wise extending pin may further include a coating material between the chord-wise extending pin and one or more of the plurality of bushings and/or between the plurality of bushings so as to decrease friction. In another embodiment, a trailing edge bushing of the plurality of bushings may extend beyond a surface of the chord-wise joint to allow an additional retention feature to be secured thereto. In further embodiments, the chord-wise extending pin may include a threaded center hole that extends from the trailing edge end to the leading edge end thereof.

In additional embodiments, the chord-wise extending pin may include one or more retention features arranged at one or both of the trailing edge end or the leading edge end thereof. For example, in one embodiment, the retention feature(s) may include a retention ring and/or a closed-end bushing.

In yet another embodiment, the chord-wise extending pin may be constructed of a plurality of pin segments secured together, e.g. at a low-stress location of the pin.

In another aspect, the present disclosure is directed to a rotor blade for a wind turbine. The rotor blade includes a first blade segment and a second blade segment extending in opposite directions from a chord-wise joint. Each of the first and second blade segments includes at least one shell member defining an airfoil surface and an internal support structure. The first blade segment includes a beam structure extending lengthwise that structurally connects with the second blade segment via a receiving section. The rotor blade also includes at least one chord-wise extending pin positioned through the chord-wise joint so as to secure the first and second blade segments together. The chord-wise extending pin defines a first outer diameter that begins at a trailing edge end thereof and a second outer diameter that ends at a leading edge end thereof. Further, the first outer diameter is larger than the second outer diameter. Moreover, the first outer diameter tapers to the second outer diameter at a transitional region of the chord-wise extending pin.

In yet another aspect, the present disclosure is directed to a method of joining first and second blade segments of a rotor blade of a wind turbine. The method includes providing the first blade segment having a beam structure that extends in a generally span-wise direction. The method also includes providing the second blade segment having a receiving section that extends in the generally span-wise direction. Further, the method includes inserting the beam structure of the first blade segment into the receiving section of the second blade segment such that the first and second blade segments extend in opposite directions from a chord-wise joint. Each of the first and second blade segments has a pressure side shell member and a suction side shell member. Moreover, the method includes inserting a chord-wise extending pin through the chord-wise joint so as to secure the first and second blade segments together. The chord-wise extending pin also includes a hollow cross-section that extends from a trailing edge end to a leading edge end thereof. It should be understood that the method may further include any of the additional features and/or steps as described herein.

As such, inserting the chord-wise extending pin through the chord-wise joint may include inserting the leading edge end of the chord-wise extending pin through a plurality of bushings provided in the internal support structures of the first and second blade segments. More specifically, inserting the chord-wise extending pin through the chord-wise joint may include engaging the first outer diameter of the trailing edge end of the chord-wise extending pin with one or more trailing edge bushings before the leading edge end of the chord-wise extending pin is inserted into one or more leading edge bushings.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
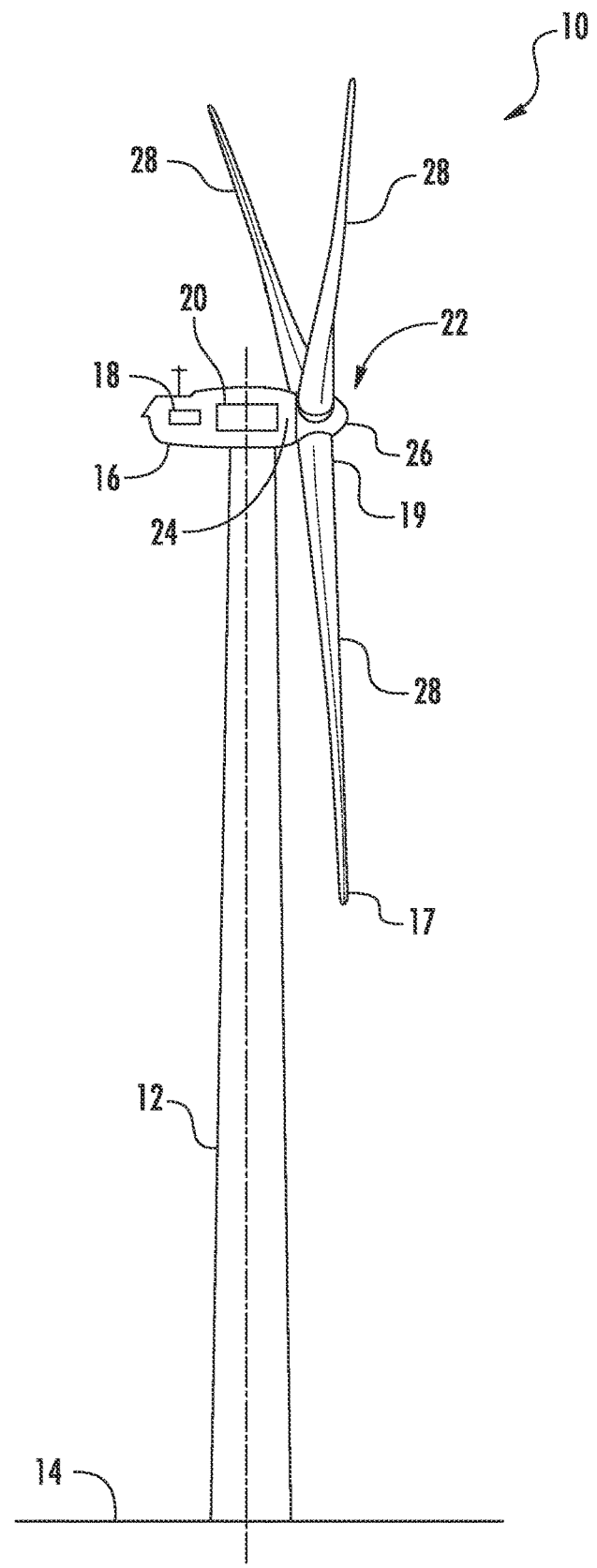
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
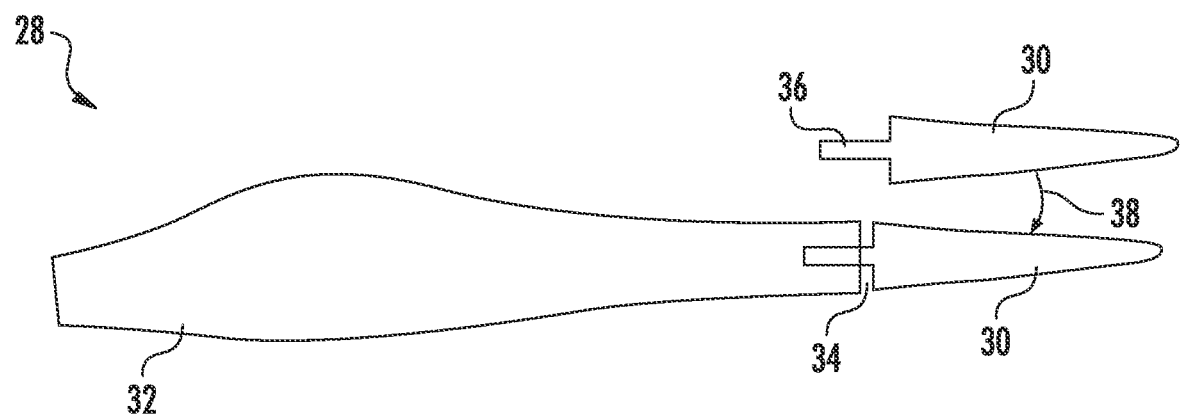
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include a pressure side shell member and a suction side shell member. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32. In addition, as shown, the second blade segment includes multiple spar structures 66 (also referred to herein as spar caps) that extend lengthwise for connecting with a blade root section 35 of the rotor blade 28 (which is shown in more detail in FIG. 7) and with the beam structure 40 of the first blade segment 30 (which is shown in more detail in FIG. 5).

Figure 3:
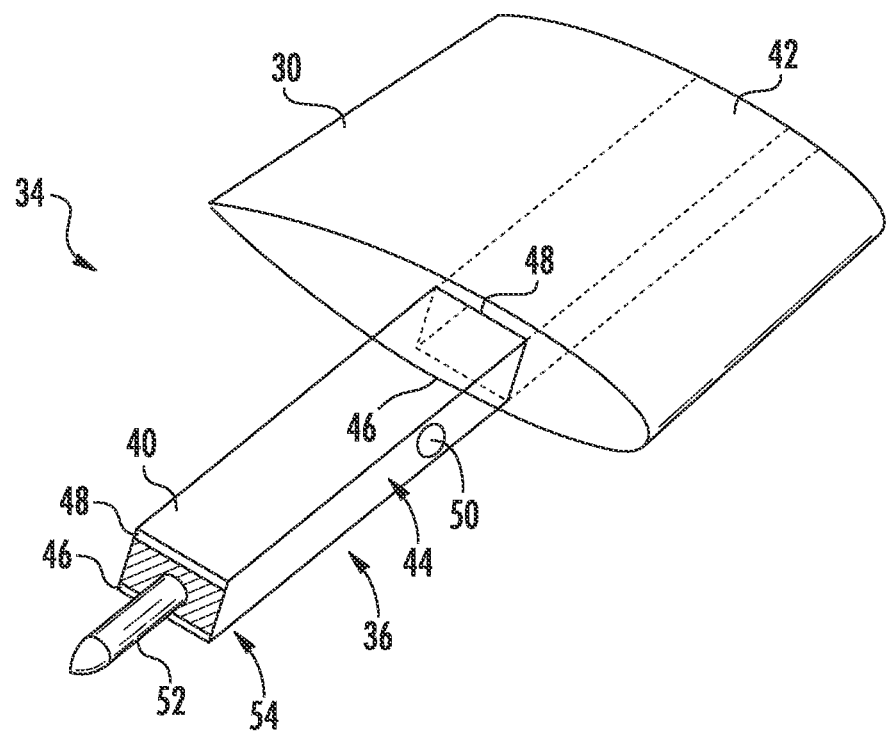
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 includes a shear web 44 connected with a suction side spar cap 46 and a pressure side spar cap 48.

Figure 7:
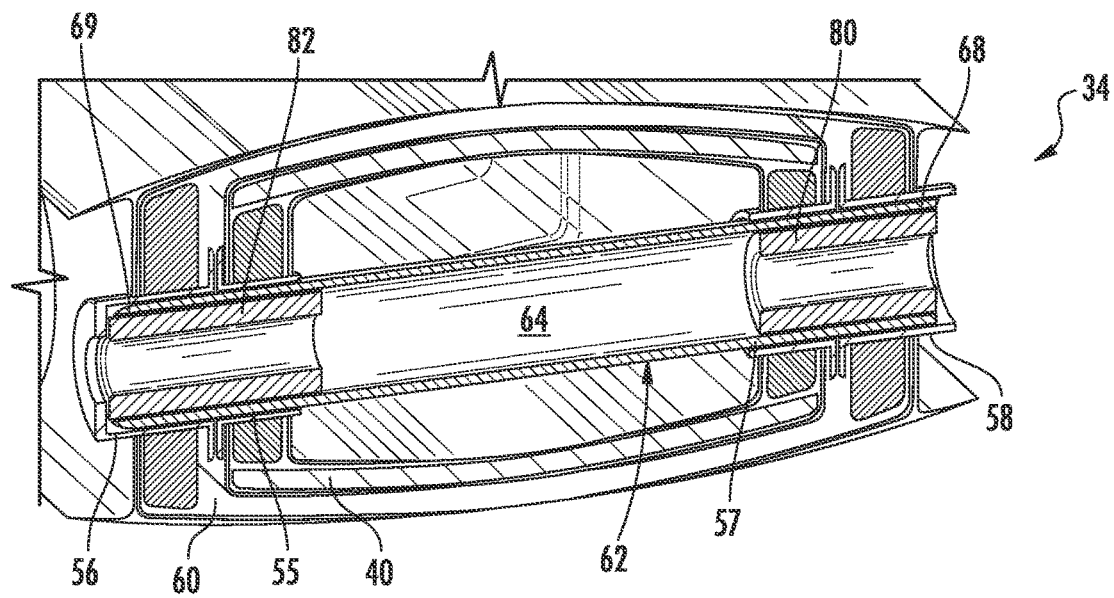
FIG. 7 illustrates a cross-sectional view of the chord-wise extending pin at the chord-wise joint of FIG. 5 along section line 7-7.

Moreover, as shown, the first blade segment 30 may include one or more first pin joints at a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 at the chord-wise joint 34. Moreover, as shown, the pin joint slot 50 may be oriented in a chord-wise direction. In one example, there may be one or more bushings 55, 57 within the pin joint slot 50 (as shown in FIG. 7).

Figure 4:
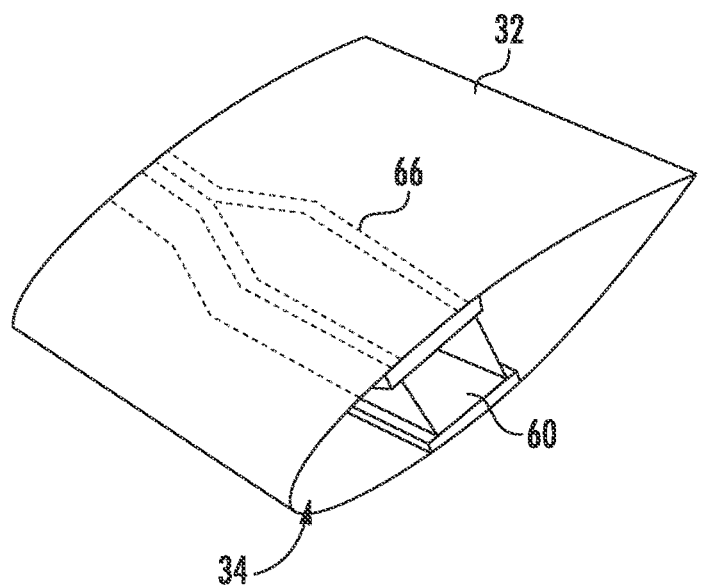
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 may include the spar structures 66 that extend lengthwise for connecting with the beam structure 40 of the first blade segment 30.

Figure 5:
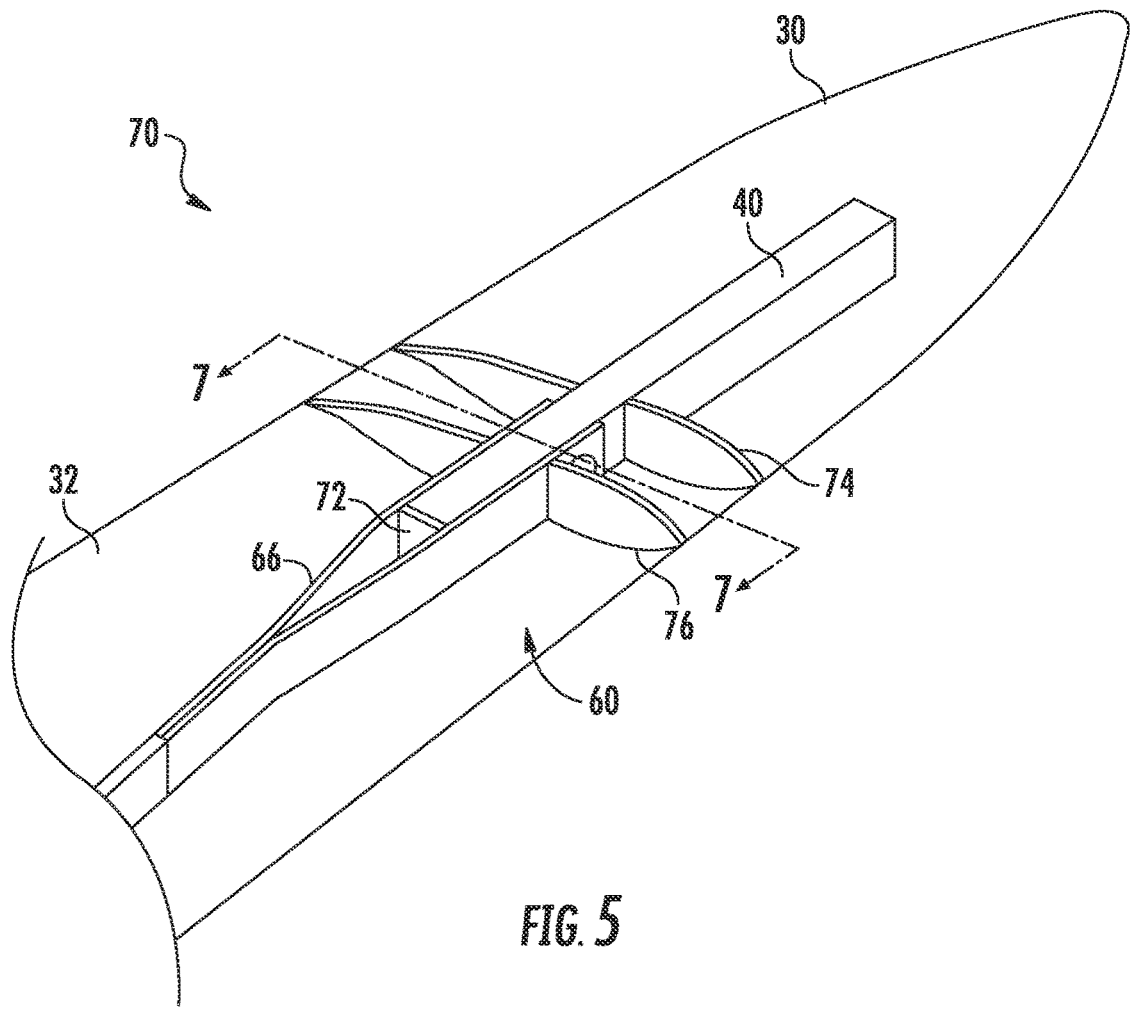
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple spar structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. In another embodiment, each of the spar structures 66, the rectangular fastening element 72, and the chord-wise members 74, 76 may be constructed of glass reinforced fibers.

Figure 6:
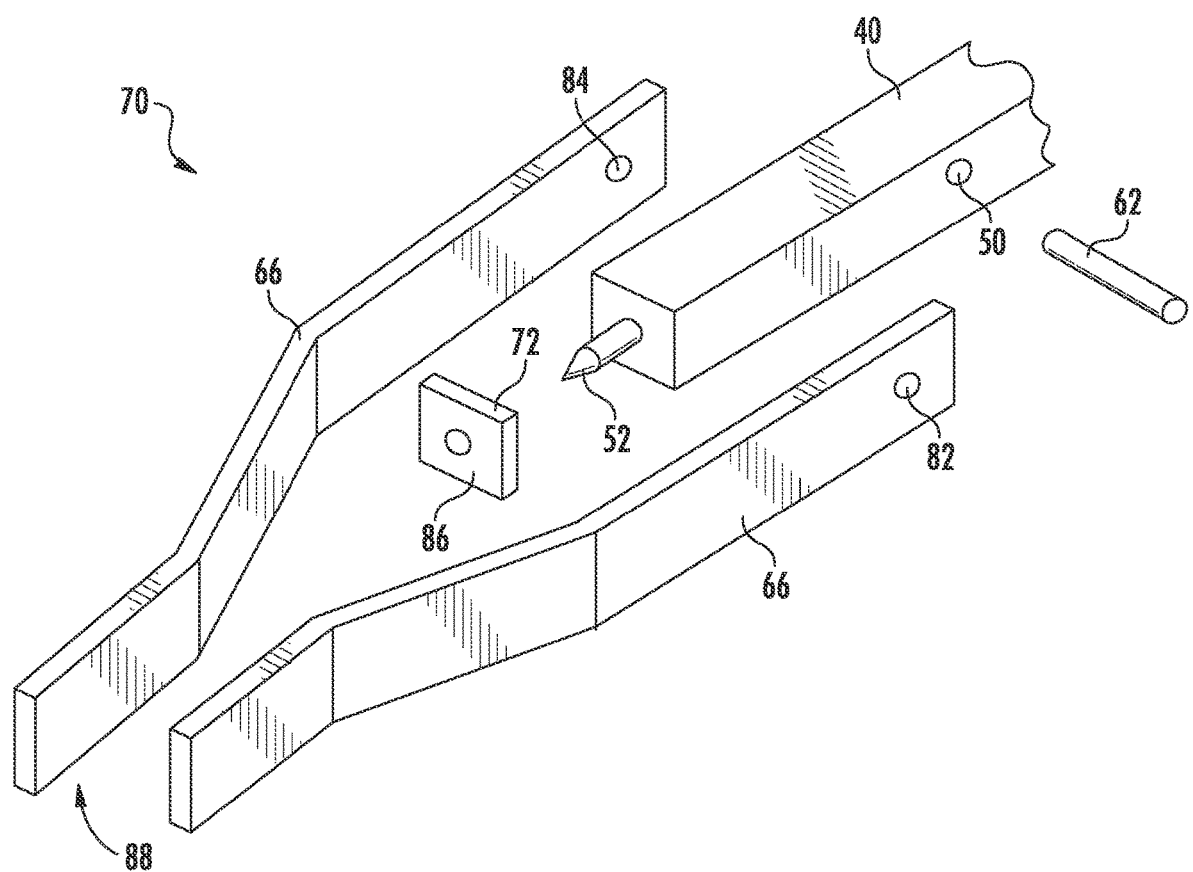
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the pair of spar structures 66 is configured to receive the beam structure 40 and may include pin joint slots 82, 84 that are aligned with the pin joint slot 50 of the beam structure 40 through which a chord-wise extending 62 may be inserted. Further, as shown, the chord-wise extending 62 may be configured to remain in a tight interference fit within the aligning pin joint slots 82, 50, 84 such that spar structures 66 and the beam structure 40 are joined together during assembly. Further, FIG. 6 also illustrates the rectangular fastening element 72 that includes a pin joint slot 86 configured for receiving the pin tube 52 of the beam structure 40. As such, the pin tube 52 is configured to form a tight interference fit pined joint. Further, the pair of spar structures 66 may be joined together at one end 88 using any suitable adhesive material or an elastomeric seal.

Referring to FIGS. 7-10, various views of the chord-wise extending pin 62 according to the present disclosure are illustrated. More particularly, FIG. 7 illustrates a cross-sectional view of the chord-wise joint 34 of FIG. 5 along section line 7-7 is illustrated. Thus, as shown, the chord-wise extending pin 62 is positioned through the chord-wise joint 34 so as to secure the internal support structures 40, 60 of the first and second blade segments 30, 32 together. More specifically, as shown, the chord-wise extending pin 62 may extend through a plurality of bushings 55, 56, 57, 58 provided in the internal support structures 40, 60 of the first and second blade segments 30, 32. For example, as shown, the beam structure 40 and the receiving section 60 may each include leading and trailing edge bushings 55, 56, 57, 58, respectively, that receive the chord-wise extending pin 62. In addition, as shown, each of the bushings 55, 56, 57, 58 may include a flange 61, 63, 65, 67 that abuts against an adjacent bushing.

Figure 8:
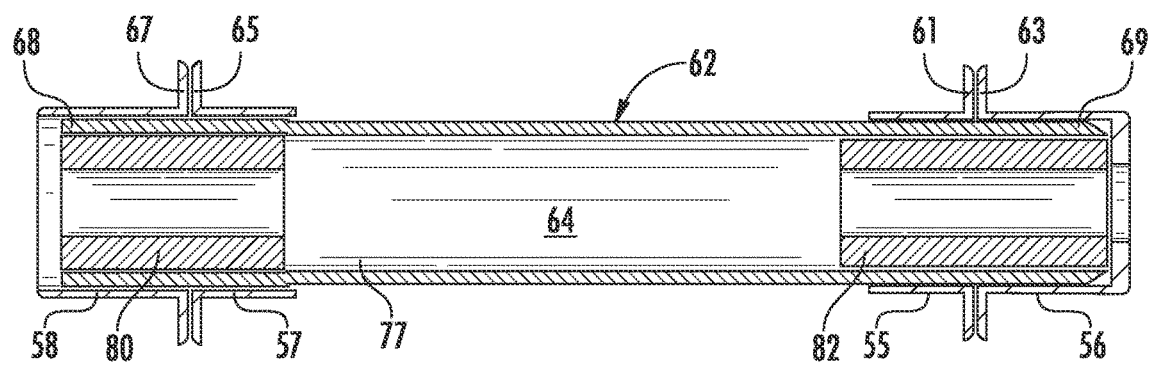
FIG. 8 illustrates a cross-sectional view of one embodiment of a chord-wise extending pin of a chord-wise joint of a rotor blade of a wind turbine according to the present disclosure.
Figure 9A:
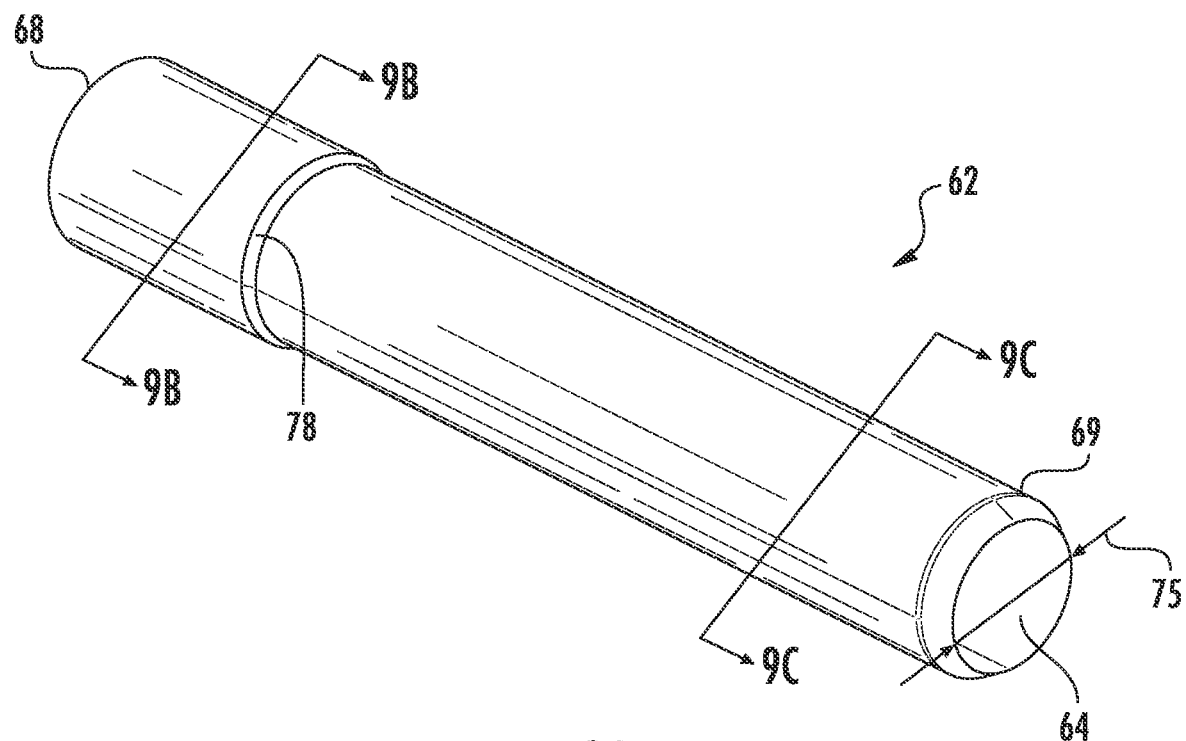
FIG. 9A illustrates a perspective view of one embodiment of a chord-wise extending pin of a chord-wise joint of a rotor blade of a wind turbine according to the present disclosure.
Figures 9B, 9C:
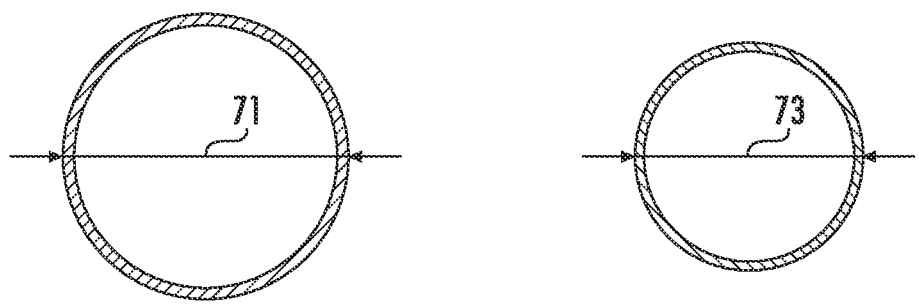
FIG. 9B illustrates a cross-sectional view of the chord-wise extending pin of FIG. 9A along section line 9B-9B.
FIG. 9C illustrates a cross-sectional view of the chord-wise extending pin of FIG. 9A along section line 9C-9C.

Further, as shown in FIGS. 7-10, the chord-wise extending pin 62 includes a hollow cross-section 64 that extends from a trailing edge end 68 to a leading edge end 69 thereof. More specifically, as shown particularly in FIGS. 9A, 9B, and 9C, the chord-wise extending pin 62 may define a first outer diameter 71 that begins at the trailing edge end 68 and a second outer diameter 73 that ends at the leading edge end 69. Further, as shown, the first outer diameter 71 is larger than the second outer diameter 73. Moreover, as shown, the first outer diameter 71 may taper to the second outer diameter 73 at a transitional region 78 of the chord-wise extending pin 62. In addition, as shown in FIG. 9A, the chord-wise extending pin 62 may further taper from the second outer diameter 73 to a smaller outer diameter 75 at the leading edge end 69. In further embodiments, as shown in FIG. 8, the chord-wise extending pin 62 may include a threaded center hole 77 that extends from the trailing edge end 68 to the leading edge end 69 thereof.

Referring specifically to FIGS. 7 and 8, the chord-wise extending pin 62 may also include one or more structural inserts 80, 81 arranged within the hollow cross-section 64. More specifically, as shown, the chord-wise extending pin 62 may include a plurality of structural inserts 80, 81 arranged within the hollow cross-section 64. For example, as shown, the chord-wise extending pin 62 may include a first structural insert 80 arranged at the trailing edge end 68 thereof and a second structural insert 81 arranged at the leading edge end 69 thereof. Further, as shown, the structural insert(s) 80, 81 may be aligned with the bushings 55, 56, 57, 58 when inserted into the hollow cross-section 64 of the chord-wise extending pin 62. In particular embodiments, the structural inserts 80, 81 may be steel inserts that are pressed into the pin 62 to provide additional reinforcement in high loading regions.

Figure 10:
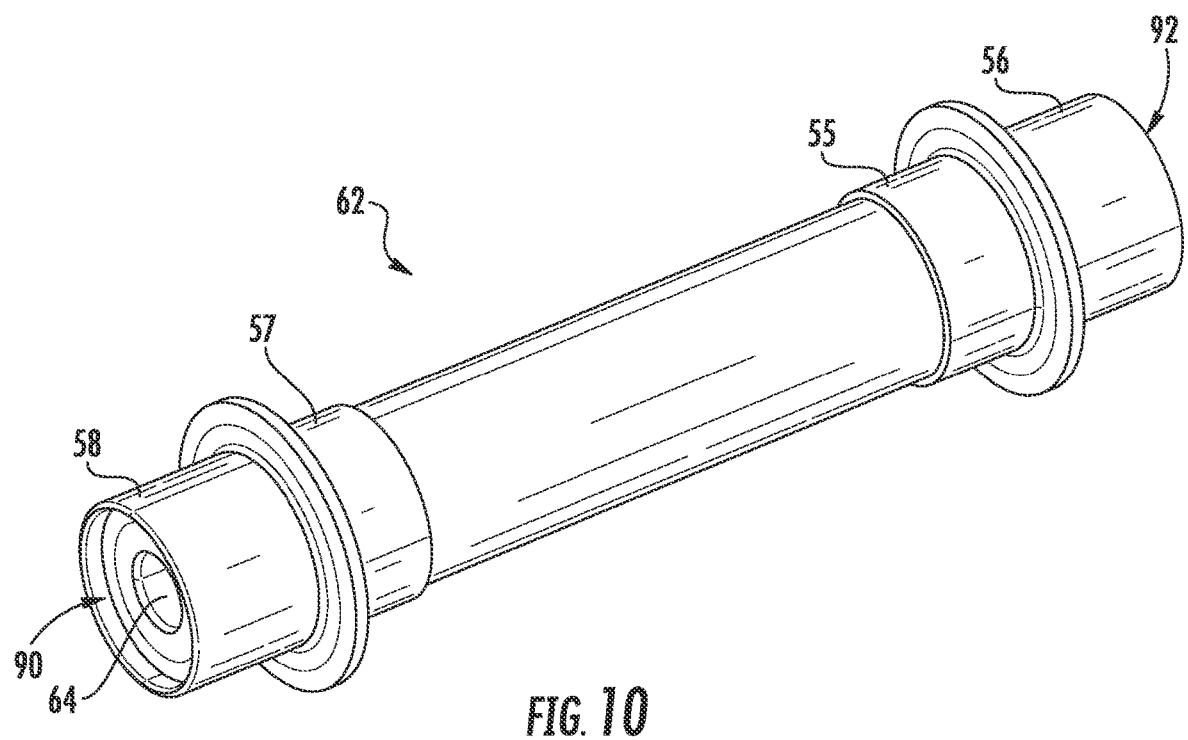
FIG. 10 illustrates a perspective view of another embodiment of a chord-wise extending pin of a chord-wise joint of a rotor blade of a wind turbine according to the present disclosure, particularly illustrating retention features at respective ends of the chord-wise extending pin.

Referring particularly to FIG. 10, the chord-wise extending pin 62 may also include one or more retention features 90, 92 arranged at one or both of the trailing edge end 68 or the leading edge end 69 thereof. For example, as shown, the retention feature(s) 90, 92 may include a retention ring 90 (i.e. at the trailing edge end 68) and/or a closed-end bushing 92 (i.e. at the leading edge end 69).

Figure 11:
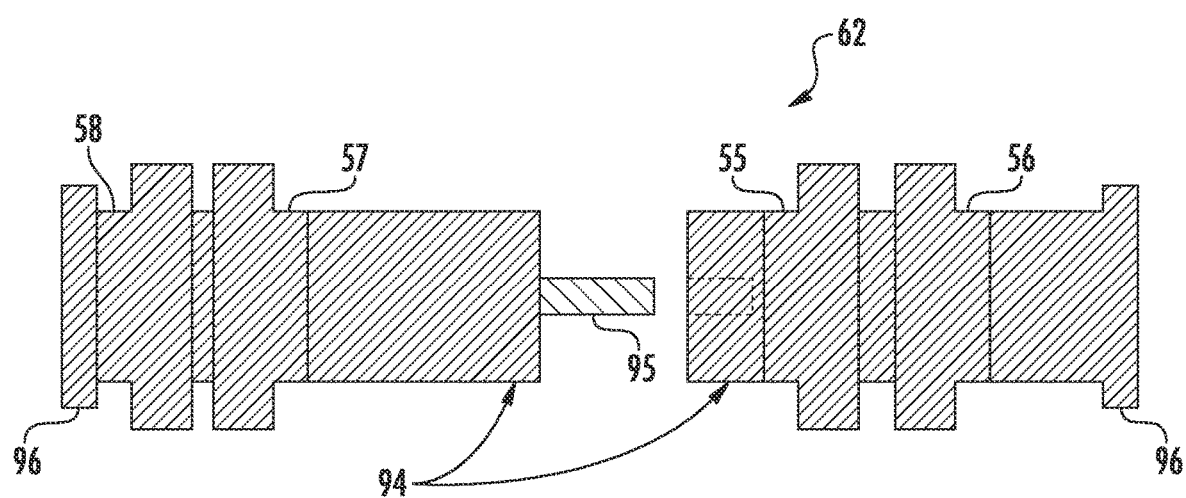
FIG. 11 illustrates a cross-sectional view of still another embodiment of a chord-wise extending pin of a chord-wise joint of a rotor blade of a wind turbine constructed of a plurality of pin segments according to the present disclosure.

Referring now to FIG. 11, the chord-wise extending pin 62 of the present disclosure may be constructed of a plurality of pin segments 94 secured together, e.g. at a low-stress location of the pin 62. For example, as shown, one of the pin segments 94 may include at least one pin screw 95 for securing the pin segments 94 together. In such embodiments, as shown, the chord-wise extending pin 62 may include one or more retention features 96 built into the pin 62. Accordingly, the segmented design allows for easier removal of the pin 62, e.g. during repairs, with enlarged end diameters to provide a securable area.

Figure 12:
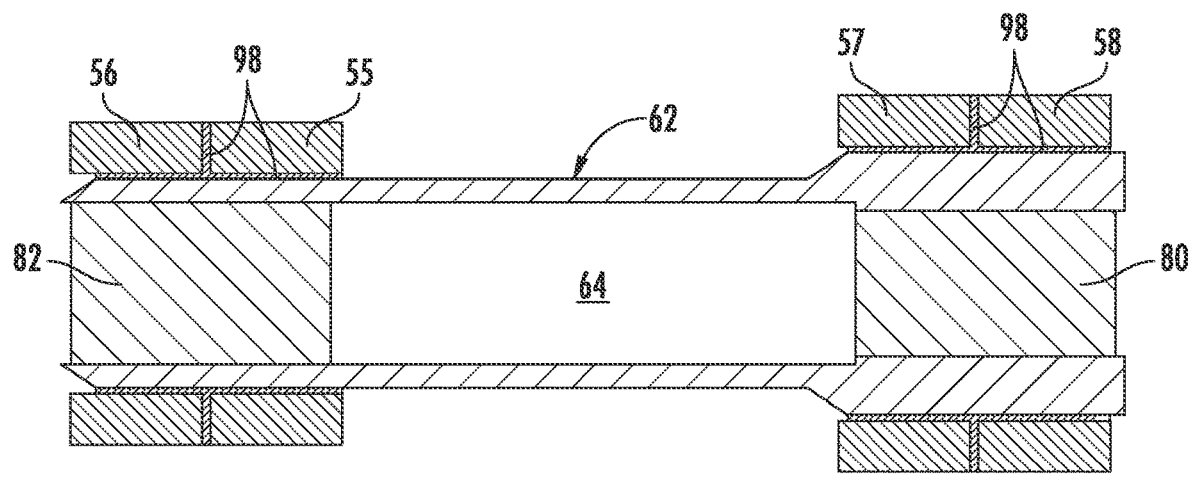
FIG. 12 illustrates a cross-sectional view of yet another embodiment of a chord-wise extending pin of a chord-wise joint of a rotor blade of a wind turbine according to the present disclosure, particularly illustrating a coating material applied between the bushings and the bushings and the chord-wise extending pin.

Referring now to FIG. 12, the chord-wise extending pin 62 of the present disclosure may further include a coating material 98 between the chord-wise extending pin 62 and the bushings 55, 56, 57, 58 and/or between each of the bushings 55, 56, 57, 58 so as to decrease friction therebetween. For example, in one embodiment, fibroids may surround at least a portion of the outer diameter of the pin 62 or an inner diameter of the bushings 55, 56, 57, 58. In another embodiment, a diamond-like coating (DCL) material may be applied to the pin 62, i.e. to increase hardness and/or decrease friction within the bushings 55, 56, 57, 58.

Figure 13:
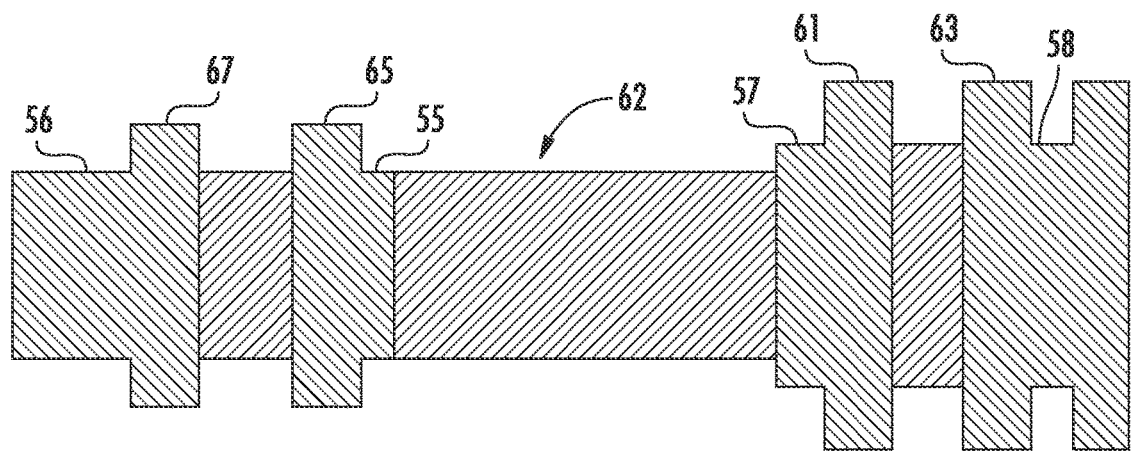
FIG. 13 illustrates a cross-sectional view of another embodiment of a chord-wise extending pin of a chord-wise joint of a rotor blade of a wind turbine according to the present disclosure, particularly illustrating a trailing edge bushing extending from the surface of the joint to allow an additional retention feature to be secured thereto.

Referring now to FIG. 13, the trailing edge bushing 56 of the chord-wise extending pin 62 of the present disclosure may be threaded. Thus, as shown, the threaded trailing edge bushing 56, i.e. of the receiving section 60, may extend out from a surface thereof so to allow an additional threaded cap (not shown) to be secured thereon.

Figure 14:
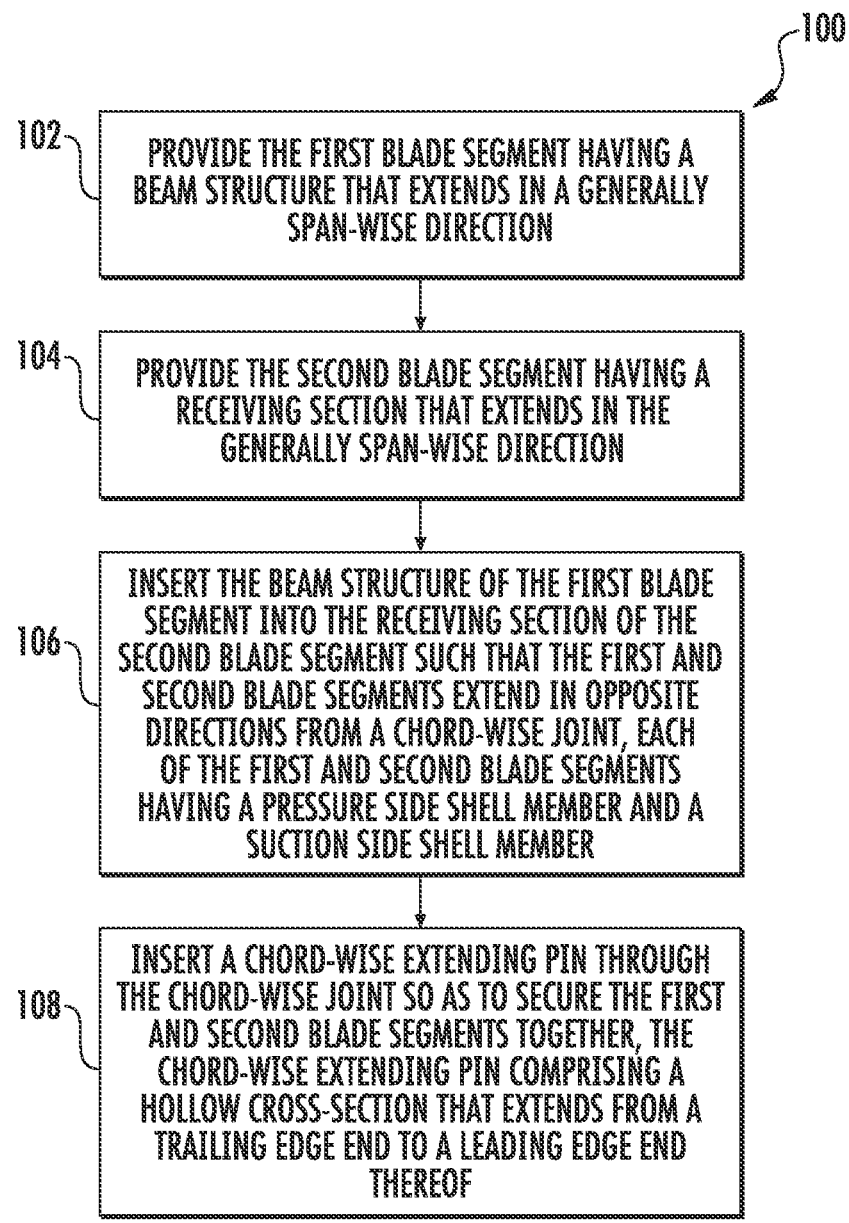
FIG. 14 illustrates a flow chart of one embodiment of a method of joining first and second blade segments of a rotor blade of a wind turbine according to the present disclosure.

Referring now to FIG. 14, a flow chart 100 of a method of joining first and second blade segments of a rotor blade of a wind turbine according to the present disclosure is illustrated. In general, the method 100 will be described herein with reference to the wind turbine 10 and the rotor blade 28 shown in FIGS. 1-13. However, it should be appreciated that the disclosed method 100 may be implemented with rotor blades having any other suitable configurations. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include providing the first blade segment 30 having the beam structure 40 that extends in a generally span-wise direction. As shown at (104), the method 100 may include providing the second blade segment 32 having the receiving section 60 that extends in the generally span-wise direction. As shown at (106), the method 100 may include inserting the beam structure 40 of the first blade segment 30 into the receiving section 60 of the second blade segment 32 such that the first and second blade segments 30, 32 extend in opposite directions from the chord-wise joint 34. As shown at (108), the method 100 may include inserting the chord-wise extending pin(s) 62 through the chord-wise joint 34 so as to secure the first and second blade segments 30, 32 together. Further, as mentioned, the chord-wise extending pin 62 also includes a hollow cross-section 64 that extends from the trailing edge end 68 to the leading edge end 69 thereof.

Figure 15:
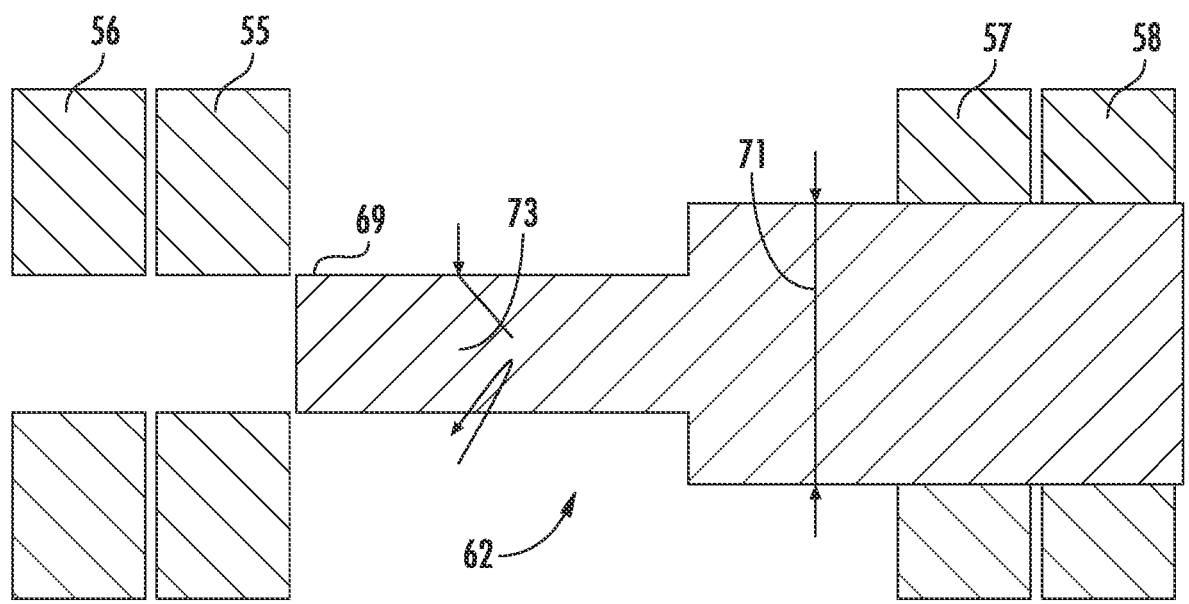
FIG. 15 illustrates a cross-sectional view of one embodiment of a chord-wise extending pin of a chord-wise joint of a rotor blade of a wind turbine according to the present disclosure, particularly illustrating a trailing edge end of the pin engaged with the trailing edge bushings of the joint before the leading edge end is engaged with the leading edge bushings of the joint.

Thus, as shown in FIG. 15, inserting the chord-wise extending pin 62 through the chord-wise joint 34 may include inserting the leading edge end 69 of the chord-wise extending pin 62 through the bushings 55, 56, 57, 58 provided in the internal support structures 40, 60 of the first and second blade segments 30, 32. More specifically, as shown, the first outer diameter 71 of the trailing edge end 68 of the chord-wise extending pin 62 may be engaged with the trailing edge bushings 57, 58 before the leading edge end 69 of the chord-wise extending pin 62 is inserted into the leading edge bushings 55, 56. As such, the pin 62 may be fully engaged with the trailing edge bushings 57, 58 before trying to engage the leading edge bushings 55, 56, which assists in properly aligning the pin 62 before inserting the pin 62 into the leading edge bushings 55, 56.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
   a first blade segment and a second blade segment extending in opposite directions from a chord-wise joint, each of the first and second blade segments comprising at least one shell member defining an airfoil surface and an internal support structure, the first blade segment comprising a beam structure extending lengthwise that structurally connects with the second blade segment via a receiving section; and
   at least one chord-wise extending pin positioned through the chord-wise joint so as to secure the first and second blade segments together, the chord-wise extending pin comprising a hollow cross-section that extends from a trailing edge end to a leading edge end thereof,
   wherein the chord-wise extending pin further comprises a plurality of structural inserts arranged within the hollow cross-section, wherein a first structural insert of the plurality of structural inserts is arranged at the trailing edge end thereof and a second structural insert of the plurality of structural inserts is arranged at the leading edge end thereof.

2. The rotor blade of claim 1, wherein the chord-wise extending pin defines a first outer diameter that begins at the trailing edge end and a second outer diameter that ends at the leading edge end, the first outer diameter being larger than the second outer diameter, the first outer diameter tapering to the second outer diameter at a transitional region of the chord-wise extending pin.

3. The rotor blade of claim 2, wherein the chord-wise extending pin further tapers from the second outer diameter to a smaller outer diameter at the leading edge end.

4. The rotor blade of claim 1, wherein the chord-wise extending pin extends through a plurality of bushings provided in the internal support structures of the first and second blade segments.

5. The rotor blade of claim 4, wherein the plurality of structural inserts are aligned with the plurality of bushings.

6. The rotor blade of claim 4, further comprising a coating material between at least one of the chord-wise extending pin and one or more of the plurality of bushings or between the plurality of bushings so as to decrease friction.

7. The rotor blade of claim 4, wherein a trailing edge bushing of the plurality of bushings extends beyond a surface of the chord-wise joint to allow an additional retention feature to be secured thereto.

8. The rotor blade of claim 1, wherein the chord-wise extending pin further comprises a threaded center hole that extends from the trailing edge end to the leading edge end thereof.

9. The rotor blade of claim 1, wherein the chord-wise extending pin further comprises one or more retention features arranged at one or both of the trailing edge end or the leading edge end thereof.

10. The rotor blade of claim 9, wherein the one or more retention features comprises at least one of a retention ring or a closed-end bushing.

11. The rotor blade of claim 1, wherein the chord-wise extending pin is constructed of a plurality of pin segments secured together.

12. A rotor blade for a wind turbine, comprising:
    a first blade segment and a second blade segment extending in opposite directions from a chord-wise joint, each of the first and second blade segments comprising at least one shell member defining an airfoil surface and an internal support structure, the first blade segment comprising a beam structure extending lengthwise that structurally connects with the second blade segment via a receiving section; and
    at least one chord-wise extending pin positioned through the chord-wise joint so as to secure the first and second blade segments together, the chord-wise extending pin defining a first outer diameter that begins at a trailing edge end thereof and a second outer diameter that ends at a leading edge end thereof, the first outer diameter being larger than the second outer diameter, the first outer diameter tapering to the second outer diameter at a transitional region of the chord-wise extending pin,
    wherein the chord-wise extending pin further comprises a plurality of structural inserts arranged within a hollow cross-section thereof, wherein a first structural insert of the plurality of structural inserts is arranged at the trailing edge end of the chord-wise extending pin and a second structural insert of the plurality of structural inserts is arranged at the leading edge end of the chord-wise extending pin.

* * * * *